(12) United States Patent
Nakari

(10) Patent No.: US 11,286,131 B2
(45) Date of Patent: Mar. 29, 2022

(54) ENERGIZING CIRCUIT OF A MAGNETIZING COIL OF AN OPERATIONAL BRAKE, A PASSENGER CONVEYOR, AND A METHOD FOR ENERGIZING THE MAGNETIZING COIL OF THE OPERATIONAL BRAKE OF A PASSENGER CONVEYOR

(71) Applicant: Kone Corporation, Helsinki (FI)

(72) Inventor: Arto Nakari, Hyvinkaa (FI)

(73) Assignee: KONE Corporation, Helsinki (FI)

( * ) Notice: Subject to any disclaimer, the term of this patent is extended or adjusted under 35 U.S.C. 154(b) by 1292 days.

(21) Appl. No.: 15/642,654

(22) Filed: Jul. 6, 2017

(65) Prior Publication Data

US 2017/0297861 A1 Oct. 19, 2017

Related U.S. Application Data

(63) Continuation of application No. PCT/EP2016/055097, filed on Mar. 10, 2016.

(30) Foreign Application Priority Data

Mar. 24, 2015 (FI) ..................................... 20155212

(51) Int. Cl.
*B66B 1/32* (2006.01)
*B66B 25/00* (2006.01)
(Continued)

(52) U.S. Cl.
CPC .................. *B66B 1/32* (2013.01); *B66B 5/02* (2013.01); *B66B 25/00* (2013.01); *B66B 29/00* (2013.01);
(Continued)

(58) Field of Classification Search
CPC ...... H02M 5/293; H02M 7/06; H02M 7/1557; H02M 7/217; H02M 2001/007;
(Continued)

(56) References Cited

U.S. PATENT DOCUMENTS

| 4,326,236 A * | 4/1982 | McNair ................. E21B 19/008 |
| | | 188/158 |
| 2005/0207195 A1* | 9/2005 | Olsson .................... H02J 9/062 |
| | | 363/125 |

(Continued)

FOREIGN PATENT DOCUMENTS

| CN | 101844715 B | 7/2013 |
| DE | 29915268 U1 | 2/2000 |

(Continued)

OTHER PUBLICATIONS

International Search Report PCT/ISA/210 for International Application No. PCT/EP2016/055097 dated Sep. 28, 2016.

(Continued)

*Primary Examiner* — Matthew V Nguyen
(74) *Attorney, Agent, or Firm* — Harness, Dickey & Pierce, P.L.C.

(57) ABSTRACT

The invention relates to an energizing circuit of at least one magnetizing coil of an operational brake, the energizing circuit being configured for energizing the magnetizing coil, which energizing circuit comprises a rectifying bridge connected to the supply network, the output terminals of the rectifying bridge being connectable/connected to the input points of the magnetizing coil,
characterized in that the energizing circuit comprises at least one reduced voltage circuit or external DC supply, whose outputs are connectable via to the to the input points of the magnetizing coil via a controllable operation switch of the (Continued)

Figure 1:
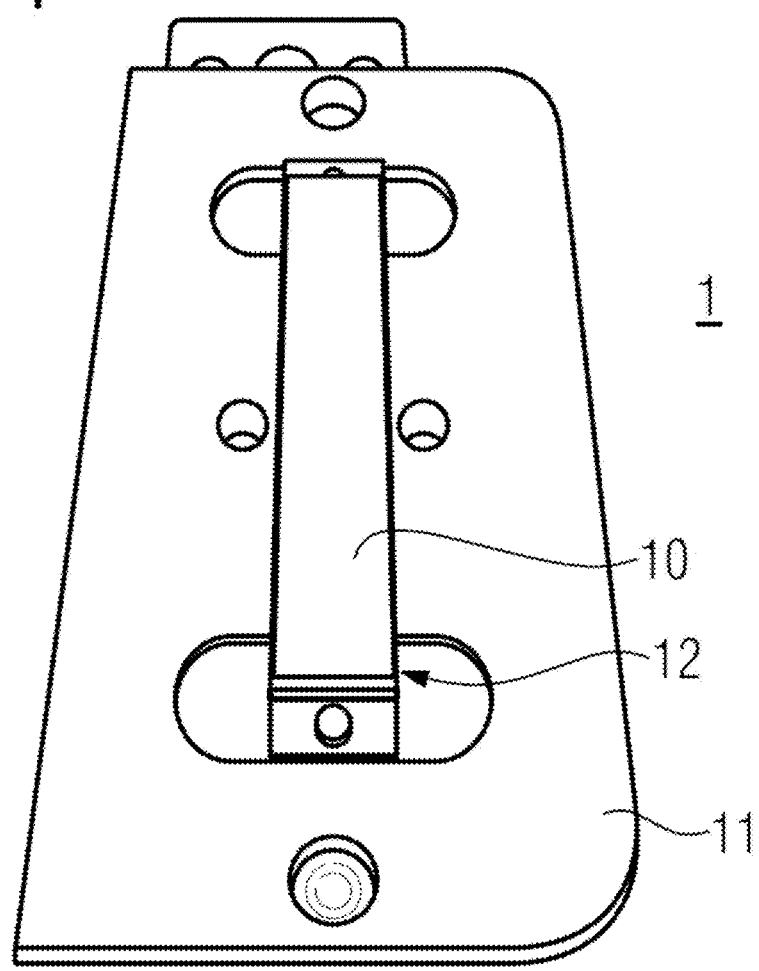

energizing circuit. The patent application also comprises claims for a passenger conveyor and for a method.

10 Claims, 3 Drawing Sheets

(51) Int. Cl.
    *B66B 29/00*     (2006.01)
    *H02M 5/293*     (2006.01)
    *H02M 7/06*     (2006.01)
    *B66B 5/02*     (2006.01)
    *H02M 7/155*     (2006.01)
    *H02M 7/217*     (2006.01)
    *H02M 1/00*     (2006.01)

(52) U.S. Cl.
    CPC ............ *H02M 5/293* (2013.01); *H02M 7/06* (2013.01); *H02M 7/1557* (2013.01); *H02M 7/217* (2013.01); *H02M 1/007* (2021.05); *Y02B 50/00* (2013.01)

(58) Field of Classification Search
    CPC ......... H02M 7/162; H02M 7/219; B66B 1/32; B66B 5/02; B66B 25/00; B66B 29/00; Y02B 50/00
    See application file for complete search history.

(56) References Cited

U.S. PATENT DOCUMENTS

| | | |
|---|---|---|
| 2009/0323380 A1 | 12/2009 | Harrison |
| 2011/0240411 A1 | 10/2011 | Rui |
| 2013/0176758 A1* | 7/2013 | Tseng .................... H02M 7/219 363/89 |
| 2017/0253460 A1* | 9/2017 | Vakkamaki ............. F16D 49/00 |
| 2020/0388423 A1* | 12/2020 | Strauss .................. H01F 7/064 |

FOREIGN PATENT DOCUMENTS

| | | | | |
|---|---|---|---|---|
| EP | 3006385 A1 * | 4/2016 | ............. | F16D 65/14 |
| FI | 124850 B | 2/2015 | | |
| JP | H03169279 A | 7/1991 | | |
| WO | WO-2010/022748 A1 | 3/2010 | | |
| WO | WO-2010081782 A1 * | 7/2010 | ............... | H02P 3/04 |
| WO | WO-2010/089450 A1 | 8/2010 | | |

OTHER PUBLICATIONS

Written Opinion PCT/ISA/237 for International Application No. PCT/EP2016/055097 dated Sep. 28, 2016.
Finish Search Report for Finnish Patent Application No. 20155212 dated Mar. 18, 2016.
"Rectifier", Feb. 24, 2015 (Feb. 24, 2015), XP055279580, Retrieved from the Internet: URL:https:jjen.wikipedia.orgjwjindex.php?title=Rectifier&oldid=648586573, [retrieved on Jun. 10, 2016].

* cited by examiner

ENERGIZING CIRCUIT OF A MAGNETIZING COIL OF AN OPERATIONAL BRAKE, A PASSENGER CONVEYOR, AND A METHOD FOR ENERGIZING THE MAGNETIZING COIL OF THE OPERATIONAL BRAKE OF A PASSENGER CONVEYOR

This application is a continuation of PCT International Application No: PCT/EP2016/055097 which has an International filing date of Mar. 10, 2016, and which claims priority to Finnish patent application number 20155212 filed Mar. 24, 2015, the entire contents of both of which are incorporated herein by reference.

FIELD OF THE INVENTION

The invention relates more particularly to an energizing circuit to be used for energizing the magnetizing coil of an operational brake. These types of energizing circuits are used e.g. in connection with passenger conveyors as e.g. escalators and elevators, but also in moving ramps and moving sidewalks.

TECHNICAL BACKGROUND

An operational brake of a passenger conveyor, e.g. of an elevator, is normally closed when the elevator car is stationary, or when the moving track of an escalator is stationary. When the elevator car/moving track starts moving, the operational brake is opened and when the elevator/moving track stops the operational brake is closed. The operational brake is a so-called normally-closed electromagnetic brake, which means that the magnetizing coil of the operational brake must be energized for opening the operational brake. When the magnetizing coil is not energized (e.g. if there is an electricity outage), the operational brake closes.

AIM OF THE INVENTION

According to the first aspect of the invention, the aim is to increase the expected lifetime of an energizing circuit to be used for controlling an operational brake.

This aim can be resolved by means of an energizing circuit of a magnetizing coil of an operational brake and by means of a method for energizing a magnetizing coil of the operational brake.

The aim according to the second aspect of the invention is to reduce the servicing requirement of a passenger conveyor.

This aim can be resolved by means of a passenger conveyor including at least one operational brake that includes the energizing circuit. Advantageous embodiments of the invention are subject matter of the dependent claims. Preferred embodiments are also disclosed in the description and drawings.

ADVANTAGES OF THE INVENTION

According to the invention the energizing circuit comprises at least one reduced voltage circuit, whose output is connectable to the input points of the magnetizing coil via a controllable operation switch of the energizing circuit.

Via this solution two different voltage signals can be forwarded via the operation switch to the magnetizing coil of the operational brake of the passenger conveyor. Particularly in escalators a problem might arise after energizing of the brake when it is kept open. This necessitates continuous energizing of the magnetizing coil of the brake and might lead to excessive heating of the magnetizing coil. This problem is solved with the above invention according to which, after the brake has been energized (released) only a reduced voltage is fed to the magnetizing coil. This reduced voltage which is generated via a reduced voltage circuit which also may be a low-voltage DC supply which is provided in most passenger conveyors and outputs a voltage between 12 and 100 V, preferably between 12 and 50 V, most preferably 24 V. Advantageously, only for the lifting of the brake the full voltage is outputted to the magnetizing coil. After the brake has been released only the reduced voltage of e.g. 24 V is fed to the magnetizing coil, avoiding any excessive heating of the magnetizing coil of the operational brake.

In a preferred embodiment of the invention the reduced voltage circuit has a controllable operation switch comprising a first and a second electronic switch device connected in series with each other and fitted on the alternating-current side of the rectifying bridge. The first and second electronic switch devices both comprise a controllable switch element and also a diode connected in antiparallel, both of which antiparallel-connected diodes of the first and second electronic switch devices are fitted in opposite directions to each other. This series connection of the two electronic switch devices forms an AC voltage divider, dividing the output voltage to the half of the input voltage. Thus this embodiment forms a simple circuit which halves the (original AV) voltage of the AC power supply network, which is mostly a public network.

In one preferred embodiment of the invention the rectifying bridge itself forms the reduced voltage circuit and its operational switch. Thus, by adapted controlling the rectifier bridge is able to output at least two different output signals depending on the operational state of the brake (higher voltage signal for lifting the brake and lower voltage signal for holding it). The advantage of this solution is that it doesn't need a separate reduced voltage circuit or a separate operation switch.

In this case the rectifying bridge advantageously comprises with four controllable semiconductor-switches as MOSFETs or IGBTs, which are connected in parallel with diodes, respectively, which allow an easy control to output different voltage signals for the magnetizing coil of the operational brake. Of course, the semiconductor-switches are controlled by the passenger conveyor control or via the brake control which obtains a signal about the operational state of the brake.

The invention also relates to a passenger conveyor, comprising at least one energizing circuit according to the above specifications.

In one embodiment of an inventive passenger conveyor a low-voltage DC supply is provided as the reduced voltage circuit. The controllable operation switch is configured— depending on the operational state of the brake—to connect to the terminals of the magnetizing coil either to the output terminals of the rectifier bridge or of the low-voltage DC supply. In both cases the magnetizing coil(s) of the operational brake(s) are fed with two different voltage signals according to the operational state of the brake (lifting or energizing the brake or keeping the brake open).

Preferably, the low-voltage DC supply has an output voltage between 12 and 100 V, preferably between 12 and 70 V, most preferably 24 V or 40V.

In the inventive method for energizing at least one magnetizing coil of at least one operational brake of a passenger conveyor, dependent on the operational state of the brake at least two different voltage signals are fed to the magnetizing coil of the operational brake. The advantages with this solution are already mentioned above in connection with the energizing circuit or the passenger conveyor, i.e. a reduced current for keeping the brake open.

In a preferred embodiment of the inventive method the magnetizing coil is energized essentially via a rectifier bridge connected to an AC supply network, and an AC voltage divider circuit is used as reduced voltage circuit to feed different AC voltage signals to the rectifier bridge. This divider circuit feeds to the rectifier bridge only the positive or negative half-cycles of the AC voltage so that the AC voltage of the (public)AC supply network is effectively halved. The divider circuit forms via its controllable switch devices also the operation switch of the energizing unit to supply either the higher or lower voltage signal to the magnetizing coil of the operational brake.

Preferably this divider circuit for providing two different AC voltage signals comprises a first and a second electronic switch device connected in series with each other are fitted on the alternating-current side of the rectifying bridge, which first and second electronic switch device both comprise a controllable switch element and also a diode connected in antiparallel, both of which antiparallel-connected diodes of the first and second electronic switch devices are fitted in opposite directions to each other.

In one embodiment of the inventive method dependent on the operational state of the brake controllable switches, particularly four MOSFETs or IGBTs connected in series with each other, of the rectifier bridge are controlled in a way as to forward two different voltage signals to the magnetizing coil. Thus the rectifier bridge itself is used as a reduced voltage circuit and as operation switch.

In a further alternative depending of the operational state of the brake either the output of the rectifying bridge or the output of a low-voltage DC supply are connected to the magnetizing coil. In this case either the low-voltage DC supply of the rectifier bridge acts as the reduced voltage circuit. This embodiment makes effective use of an existing low-voltage DC supply, preferably 12-100V, more preferably 24-50V, most preferably 24 or 40 or 48 V.

The energizing circuit of a magnetizing coil of an operational brake, for energizing the magnetizing coil via the input points of the magnetizing coil essentially with alternating current to be taken via the connection points of the supply network, comprises a rectifying bridge between the connection points and the input points as well as a first and a second electronic switch device connected in series with each other and fitted on the alternating-current side of the rectifying bridge, which first and second electronic switch device both comprise a controllable switch element and also a diode connected in antiparallel, both of which antiparallel-connected diodes of the first and second electronic switch devices are fitted in opposite directions to each other. The expected lifetime of this type of energizing circuit is longer than those of relay-based solutions. In this way an energizing circuit having a lifetime covering e.g. over 10 million energizings can be relatively easily implemented.

Preferably the rectifying bridge comprises diodes and thyristors.

One possible alternative embodiment is that the rectifying bridge can be replaced with four MOSFETs or IGBTs, in which are parallel diodes, in which case these most preferably also replace the first and second electronic switches. Although this solution would require more gate drivers (drivers and generally also floating power supplies) and would raise the price, the advantages of a synchronous rectifier can be obtained with the use of MOSFETs, i.e. forward voltage losses can be significantly smaller than when using diodes. Although the price would be higher, the losses are smaller if the diode bridge replaced with power transistors.

The control gate of the first and second controllable switch element can be configured to respond to a control signal, in which case the energizing circuit can be controlled by means of, for instance, a control system of the energizing circuit implemented in connection with the passenger conveyor. This type of control system can preferably be disposed e.g. in connection with the passenger conveyor control.

Advantageously, the energizing circuit additionally comprises a third electronic switch device between the input points, which switch comprises a third controllable switch that is connected in series with the magnetizing coil via an input point. In this way the energizing current of the magnetizing coil can be cancelled by means of ohm dissipation, which enables rapid cancellation of the energizing of the magnetizing coil. Particularly in connection with a passenger conveyor, in this way it can be possible to speed up closing of the operational brake, e.g. in an emergency situation.

Most preferably the first and second electronic switch device is/are or comprises/comprise a) a type of bipolar transistor or IGBT having an antiparallel diode connected in parallel, or b) a MOSFET.

For use, the input points of the energizing circuit are preferably connected directly across the magnetizing coil. Most preferably the magnetizing coil is the magnetizing coil of an operational brake of a passenger conveyor.

A passenger conveyor according to the second aspect of the invention comprises an operational brake having an energizing circuit according to the first aspect of the invention. This type of elevator can be implemented to be relatively service-free, at least with regard to the energizing circuit of the operational brake.

When the energizing circuit comprises a third electronic switch device between the input points in the manner described above, the third switch being configured to short-circuit the input points, and when the passenger conveyor additionally comprises a control system for the energizing circuit, e.g. in connection with the passenger conveyor control, which control system is configured:

in normal operation to control all three electronic switch devices in such a way that when controlling the operational brake open, all three electronic switch devices are controlled to be conductive until the current needed for opening the operational brake is received in the magnetizing coil of the operational brake, after which one the first and the second electronic switch devices is opened, in a normal stop to open the first electronic switch device and the second electronic switch device when the third electronic switch device is closed, in which case the current of the magnetizing coil drops by means of the forward loss of the magnetizing coil caused by the rectifying bridge, and in a rapid stop to open the third electronic switch, in which case the current of the magnetizing coil is rapidly quenched by the counter voltage produced via the diode and the variable resistor functioning as a quenching circuit, the control of the energizing circuit can be constructed to be simple but, however, in such a way that the energizing power of the magnetizing coil can be adjusted.

The first electronic switch device and/or the second electronic switch device of the passenger conveyor can be switched on for a period of time deemed suitable when it is detected that the current of the magnetizing coil has dropped below an intended holding current, until the current of the magnetizing coil is detected to have increased to the intended holding current. In this way it is possible to adjust the energizing of the magnetizing coil in a relatively simple manner.

In the method for energizing a magnetizing coil of an operational brake of a passenger conveyor, the magnetizing coil is energized via its input points essentially with alternating current to be taken via the connection points of the supply network by using between the connection points and input points of the energizing circuit a rectifying bridge as well as a first and a second electronic switch device connected in series with each other and fitted on the alternating-current side of the rectifying bridge, which first and second electronic switch device both comprise a controllable switch element and also a diode connected in antiparallel, both of which antiparallel-connected diodes of the first and second electronic switch devices are fitted in opposite directions to each other, or four MOSFETs or IGBTs connected in series with each other, in which are parallel diodes in such a way that the diodes offer a pathway for the off-state.

By means of the method a circuit to be used for energizing the magnetizing coil of the operational brake of a passenger conveyor can be implemented to be more service-free, particularly compared to an energizing circuit implemented using relays.

LIST OF DRAWINGS

Figure 2:
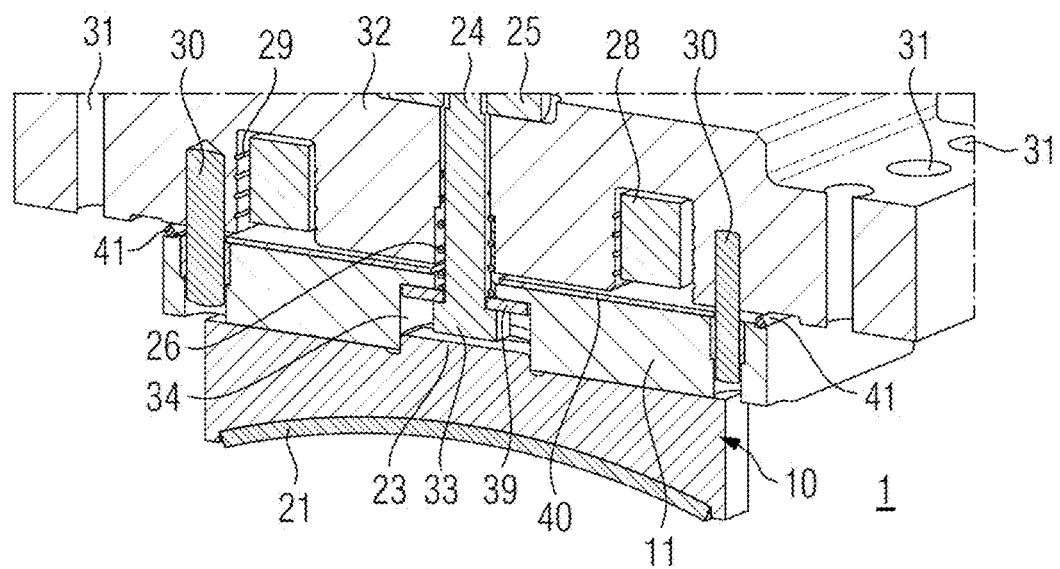
Figure 3:
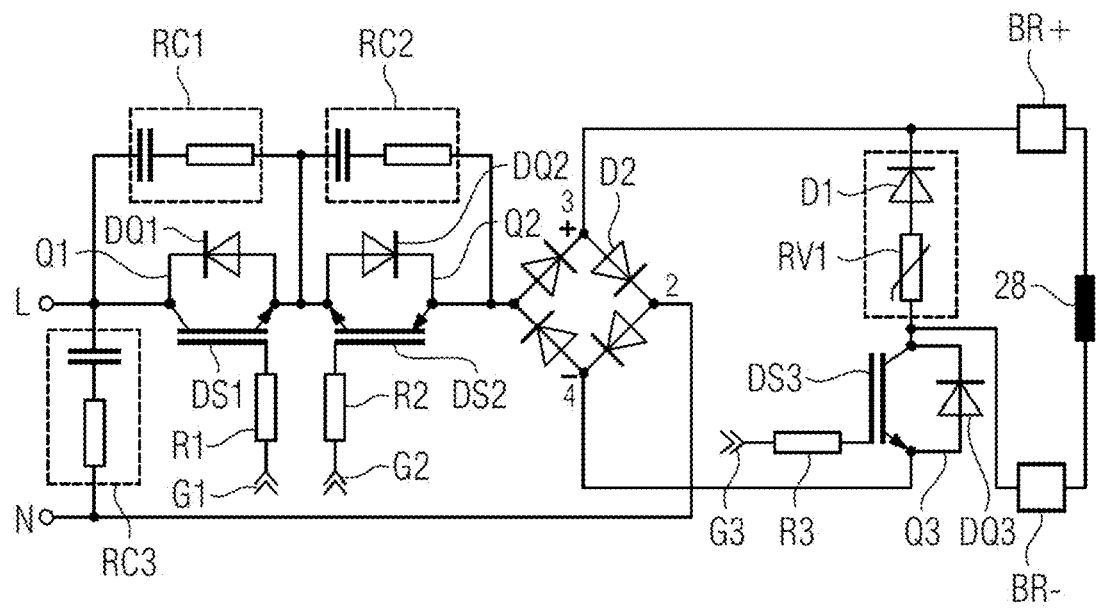
Figure 4:
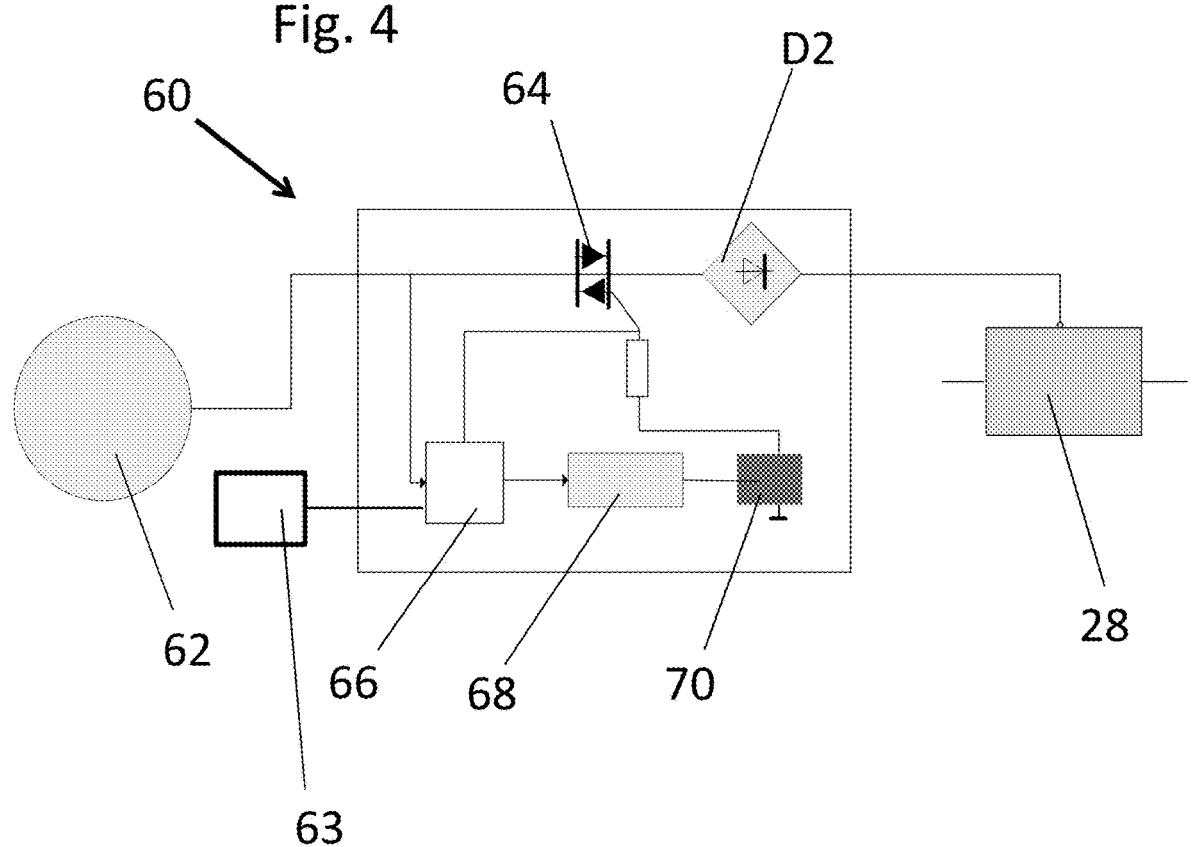

In the following the operational brake of a passenger conveyor and the passenger conveyor will be presented in more detail by the aid of the embodiment in the appended drawing FIG. 3. Of the drawings:

FIG. 1 presents a part of an operational brake of a passenger conveyor according to the state of the art;

FIG. 2 presents a cross-section of an operational brake of a passenger conveyor according to the state of the art;

FIG. 3 presents an energizing circuit of a magnetizing coil of an operational brake according to the invention; and FIG. 4 presents one further embodiment of an energizing circuit according to the invention.

The same reference numbers refer to the same or functional identical parts in all the Figs.

DETAILED DESCRIPTION

FIG. 1 presents an operational brake 1 of a passenger conveyor, e.g. of an elevator, the brake being known from the applicant's Finnish patent FI 124850 B. The operational brake 1 comprises a brake shoe 10, which is in a pocket 12 that is in the disc 11 of the operational brake 1. FIG. 2 also presents a corresponding operational brake 1.

The operational brake 1 comprises a frame part 32, which is fastened to a fixed structure, usually to the stationary frame part of the hoisting machine of the passenger conveyor, e.g. via fixing holes 31. In addition, the operational brake 1 comprises a brake shoe 10 that is movable with respect to the frame part 32. The brake shoe 10 comprises a holder 22 and a friction surface 21.

The brake shoe 10 is fixed to the disc 11 of the operational brake. Most preferably the fixing is implemented by using fixing bolts to be installed via fixing lugs. The disc 11 is movably supported on the frame part 32 by the aid of a guide arm 24.

There is a manual opening 25 (an opening lever) of the spring at the top end of the guide arm 24. The task of the guide arm is to transmit manual opening force from the manual opening lever to the disc 11, with which manual opening is implemented if for some reason it is not possible to use the electromagnet (e.g. owing to an electricity outage). The brake shoe 10 is not attached to the guide arm 24.

The brake shoe 10 is supported on the disc 11 by the aid of a protrusion 23 that is shorter than the brake shoe 10. The protrusion 23 is in a recess 34 that is most preferably implemented as a bore. The expansion 33 of the guide arm extends into the recess 34. At the point of the guide arm fixing the brake shoe 10 can be supported in the disc 11 via the protrusion 23 and the possible recess in the disc 11.

The operational brake 1 also comprises a magnetizing coil 28 of the electromagnet. The magnetizing coil 28 of the electromagnet is disposed in a recess made in the frame part 32. The edges 29 of the recess are most preferably grooved so that any casting resin possibly used attaches better to the edges of the winding groove, in which case the magnetizing coil 28 stays more surely in its recess.

The closing spring of the operational brake 1, said spring being omitted from the drawing FIG. 2 for the sake of clarity, keeps the operational brake 1 closed, i.e. it presses the brake shoe 10 and the disc 11 farther from the frame part 32 when the magnetizing coil 28 of the electromagnet is not energized.

When the magnetizing coil 28 of the electromagnet is energized, the force of the electromagnet exceeds the force of the closing spring, in which case the brake shoe 10 and the disc 11 move closer to the frame part 32, in which case the operational brake 2 opens.

From the viewpoint of the operation of the electromagnet, it is essential that the frame part 32 is a magnetically conductive material and that the disc 11 is a magnetically conductive material. An air gap must be kept between the frame part 32 and the disc 11.

There can be a damper 40 in the air gap, e.g. in the manner disclosed in the applicant's Finnish patent FI 124850 B.

Movement of the disc 27 in relation to the frame part 32 can be guided by using guide pins 30. For closing the air gap, it can be ensured with a seal 41 that dirt generally, and more particularly dirt produced by wearing of the brake shoe 10, does not get into the air gap.

With respect to the operation of the spacer plate 39, positioning spring 26 and guide arm 24 that are possibly in the operational brake 1 as well as with respect to other possible mechanical components, reference is made in this context to the structure of the operational brake presented in the applicant's Finnish patent FI 124850 B.

The electromagnet of the operational brake 1 is controlled electrically, i.e. in other words the circuit used for energizing the magnetizing coil 28 of the electromagnet is controlled electrically. Drawing FIG. 4a of the applicant's international patent application, which is published with the application number WO 2010/089450 A1, describes an exemplary structure of a circuit to be used for energizing a magnetizing coil 28 as known so far.

In previous solutions in the electrical controls of an operational brake 1, relays or contactors that are electromechanical have mainly been used, or otherwise semiconductor-based DC choppers based on pulse width modulation.

In these types of conventional controls for an operational brake 1, the rather short lifetime of the components to be used for control is problematic or the structure of the control is at least complex.

A major drawback in relay-based control circuits is the limited lifetime of the relays, which without component replacement performed as a servicing procedure has been limited to a few million connection events. This means the number of service runs of the passenger conveyor. Nowadays a total of at least 10 million service runs are expected of a passenger conveyor, i.e. the relays must be replaced a number of times during the projected lifetime of the passenger conveyor.

When using a relay-based circuit-breaker with an inductive load, a special snubber circuit is needed as a peripheral component, which at the moment the relay opens captures the current from the contact being opened, thus preventing arcing occurring in the contact. Snubbers generally need large capacitors, which need to discharge, e.g. with resistors, before the relay can be opened the next time when energized. The discharging causes extra power losses.

A problem with control circuits in which are DC choppers is unreasonable complexity in relation to the requirement of the circuit. Namely, an inductive component generally needed in DC choppers is not needed in a brake control application because the magnetizing coil 28 of an operational brake 1 is in fact itself a coil and is typically of such a large value that a high chopper frequency has no corresponding advantage in forming the current.

FIG. 3 presents an energizing circuit 50 of the magnetizing coil 28 of an operational brake 1. The energizing circuit 50 is connected from the connection points BR+ and BR− across the magnetizing coil 28 and, on the other hand, from one connection point L to the phase conductor (e.g. 230 V AC) of the supply network and from at least one connection point N to the ground reference plane, e.g. to the neutral conductor of the supply network.

An RC circuit RC3 is between the connection points L and N.

The phase L that has come from the supply network is connected to the neutral conductor first across the serially-connected electronic switch devices Q1 and Q2 and via the RC circuits RC1 and RC2 connected in parallel with said switches, and also in series with the rectifying bridge D2 (e.g. diode bridge). The first and second electronic switch devices Q1, Q2 both comprise a controllable switch element DS1, DS2 and also a diode DQ1, DQ2 connected in antiparallel. The antiparallel-connected diodes DQ1, DQ2 are fitted in opposite directions to each other.

The control gate of the first controllable switch element DS1 is controlled with a signal G1, which most preferably is taken across the resistor R1 to the controllable switch element DS1.

The control gate of the second controllable switch element DS2 is controlled with a signal G2, which most preferably is taken across the resistor R2 to the second controllable switch element DS2.

The rectifying bridge D2 is connected to the third electronic switch device Q3 across the diode D1 and the variable resistor RV1. Most preferably these are configured to function as a quenching circuit.

The control gate of the third controllable switch element DS3 controlling the third electronic switch device Q3 is controlled with a signal G3, which most preferably is taken across the resistor R3 to the controllable switch element DS3.

In other words the connection of the energizing circuit 50 is therefore most preferably implemented by forming an AC-voltage switch with two serially-connected electronic switch devices Q1 and Q2 functioning as a DC-switch, that together or separately are able to control the full-wave or half-wave of the supply network or to prevent controlling of the full-wave or half-wave via a rectifier (rectifying bridge D2) to the magnetizing coil 28 of the operational brake 1, enabling adjustment of the brake current.

The new energizing circuit 50 thus uses in normal operation most preferably all three electronic switch devices Q1, Q2 and Q3 as switches in such a way that when controlling the operational brake 1 open, all three electronic switch devices Q1, Q2 and Q3 are controlled to be conductive and from this it follows that the full-wave rectified voltage of the supply voltage forms a sufficiently large current needed for opening the magnetizing coil 28 of the operational brake 1. When operating current has been controlled over the magnetizing coil 28 for the desired time, one of the two electronic switch devices Q1, Q2 (either the electronic switch device Q1 or the electronic switch device Q2, depending on which it is desired to control) that is on the AC voltage side is opened, in which case the voltage in the magnetizing coil 28 changes from full-wave rectified into half-wave rectified, causing a halving of the current, which is a conventional situation/requirement.

If necessary, particularly if the current of the magnetizing coil 28 drops below the intended holding current, the first electronic switch device Q1 or the second electronic switch device Q2 can be switched on again for a period of time deemed suitable, until the current of the magnetizing coil 28 increases to the intended value.

Closing, i.e. drop-out, of the operational brake 1 in normal stopping occurs by opening the first electronic switch device Q1 and the second electronic switch device Q2, in which case the current of the magnetizing coil 28 drops slowly owing to counter voltage of the magnitude of the forward loss of the two diodes formed by the rectifying bridge D2 (e.g. diode bridge) to the magnetizing coil 28 (in this way a slow flux return is obtained).

When a fast drop-out of the operational brake is required, (e.g. in an emergency stop situation, or when it is otherwise desired to quickly drop out the operational brake 1) the third electronic switch device Q3 is opened (although the first electronic switch device Q1 and the second electronic switch device Q2 are still closed), in which case the current of the magnetizing coil 28 is rapidly quenched by large counter voltage.

Counter voltage can be formed with a counter voltage circuit comprising active and/or passive components, e.g. by means of the capacitors C1, C3. In this way a rapid flux return is obtained.

By means of the energizing circuit 50, a significantly longer lifetime is obtained as a primary improvement compared to a relay-based solution, in which case the energizing circuit 50 and the components used in it can be dimensioned to last the whole lifetime of the passenger conveyor, e.g. for over 10 million service runs.

Since a power transistor is suited for disconnecting an inductive current, it does not need a snubber circuit provided with a large capacitor, owing to which the electronic switch devices Q1, Q2 can be controlled, if necessary to be conductive for instance on every fourth half-cycle for increasing the current, which would not be possible if the discharge time in a snubber is a number of seconds.

Compared to semiconductor-based chopper solutions, an advantage of the energizing circuits 50 is a lower cooling requirement owing to the low operating frequency/chopper frequency. The electronic switch devices Q1, Q2 can be optimized for the small voltage loss of the conductive state and the losses produced by the switching speed are not a significant drawback, i.e. slow transistors can be used as the controllable switch elements DS1, DS2 in the electronic switch devices Q1, Q2, and in this way the problems caused by electromagnet interference can be avoided.

It is necessary to provide a current path for the current of the off-state in connection each electronic switch device Q1, Q2, Q3. For this reason a diode DQ1, DQ2, DQ3 is connected in parallel with each controllable switch element DS1, DS2, DS3, e.g. power transistor, for the electronic switch devices Q1, Q2, Q3 presented in FIG. 3. The use of a separate diode DQ1, DQ2, DQ3 is not however necessary.

More particularly, a bipolar transistor, IGBT or MOSFET can be used as an electronic switch device Q1 and Q2.

If the electronic switch devices Q1, Q2 are implemented with bipolar transistors or with IGBTs, each electronic switch device Q1, Q2 should be provided with an external parallel diode DQ1, DQ2, DQ3 (if such is not already integrated into the component) for the current path of the off-state. The parallel diodes DQ1 and DQ2 should also be connected in antiparallel.

A MOSFET can be used as they are as an electronic switch device Q1, Q2 or, if necessary, as a controllable switch element DS1, DS2, in which case in the latter case it must be provided with an external parallel diode DQ1, DQ2 for reducing losses. Of the options mentioned, IGBTs or MOSFETs are best owing to the low control power needed by them.

As an alternative to reverse-connected electronic switch devices Q1, Q2 and a rectifying bridge D2 being connected in series, with which the inductive load current of the magnetizing coil 28 is adjusted for regulating the operational brake 1 of in particular a passenger conveyor, the energizing circuit 50 can be implemented as a so-called synchronous rectifier version, wherein the rectifying bridge D2, which in practice comprises diodes or thyristors, is replaced with four MOSFETs or IGBTs that have parallel diodes.

The rectifying bridge D2 can be a diode bridge or a rectifying bridge implemented with controllable semiconductor switches (thyristors, MOSFET).

In this case the control of the operational brake 1 occurs in such a way that the operational brake 1 is opened by closing the electronic switch devices Q1, Q2, and, after the opening, the electronic switch device Q2 is opened but the electronic switch device Q1 is held closed, in which case the holding current of the operational brake 1 decreases and the power losses of the operational brake 1 diminish. The operational brake is activated by opening both electronic switch devices Q1 and Q2.

Alternatively, the brake current can also be adjusted by pulsing the electronic switch device Q1, or both the electronic switch device Q1 and the electronic switch device Q2, in which case commutation of the magnetizing coil 28 of the operational brake 1 occurs via the rectifying bridge D2.

The connection of the switch elements DS1, DS2 (common emitter circuit) enables the voltage source connected to the same electrical reference point to be used in the gate drivers of both switch elements DS1, DS2, which simplifies the topology of the circuit.

More particularly, using a serial connection of two power transistors as an AC switch offers the advantage that although separate gate drivers (e.g. an optical or pulse transformer) would be needed, the gate power can be common to the power transistors because the emitters are together and the emitter can function as a common ground plane for gate power in floating gate power.

FIG. 4 shows an embodiment of an energizing circuit 60 to be connected to a (public) AC power supply network 62, which usually have voltages of 220Y/380V AC. the energizing circuit 60 comprises a triac 64 connected in series with a DC rectifier bridge D2, whose outputs feeds the magnetizing coil 28 of the operational brake of the passenger conveyor.

The triac 64 is controlled by a control circuit 66 in connection with a PWM processor 68 and a semiconductor control switch 70. The control circuit 66 is connected with a brake control 63 to obtain the operational status of the brake. If the brake has been energized as to be released the control circuit 66 gets the corresponding brake status signal from the brake control 63 and controls the triac 64 to reduce the AC voltage fed to the rectifying bridge D2 for holding the brake open. When the brake is to be energized (released) the triac is preferably controlled to let the full AC voltage of the supply network 62 pass to the rectifier bridge D2. Thus, dependent on the brake status at least two different voltage signals are fed to the magnetizing coil 28 of the operational brake 1.

The invention must not be regarded as being limited only to the claims below but instead should be understood to include all legal equivalents of said claims and combinations of the embodiments presented.

LIST OF REFERENCE NUMBERS

L connection point (phase conductor of supply network)
N connection point (neutral conductor)
BR+, BR− input point
D1 diode
D2 rectifying bridge, such as a diode bridge
C1, C3 capacitor
G1, G2 control signal
Q1, Q2, Q3 electronic switch device
R1, R2, R3 resistor
RC1, RC2, RC3 resistance-capacitance (RC) circuit
RV1 variable resistor
DQ1, DQ2, DQ3 diode
DS1, DS2, DS3 controllable switch element
1 operational brake
10 brake shoe
11 disc of operational brake
12 pocket
21 friction surface
23 protrusion
24 guide arm
25 fixing/adjustment part
26 positioning spring of guide arm
28 magnetizing coil of electromagnet
29 edges of recess
30 guide pin
31 fixing hole
32 frame part
33 widening
34 recess
39 spacer shim
40 damper
41 damper 50 energizing circuit
60 energizing circuit
62 (public) AC supply network (220V, 380V)
63 brake control
64 Triac
66 Control circuit
68 PWM processor
70 semiconductor control switch

The invention claimed is:

1. An energizing circuit of a magnetizing coil of an operational brake, the energizing circuit being configured for energizing the magnetizing coil, the energizing circuit comprising:
   a rectifying bridge connected to an AC supply network, the rectifying bridge including output terminals that are connectable to input points of the magnetizing coil; and
   at least one reduced voltage circuit, the at least one reduced voltage circuit including an output that is connectable to the input points of the magnetizing coil via a controllable operation switch,
   wherein the controllable operation switch includes a first electronic switch device and a second electronic switch device connected in series with each other and fitted on an alternating-current side of the rectifying bridge,
   wherein the first electronic switch device includes a first controllable switch element and a first diode connected in antiparallel,
   wherein the second electronic switch device includes a second controllable switch element and a second diode connected in antiparallel, and
   wherein the first diode and the second diode are fitted in opposite directions to each other.

2. The energizing circuit according to claim 1, wherein control gates of the first controllable switch element and the second controllable switch element are configured to respond to separate, respective control signals.

3. The energizing circuit according to claim 1, further comprising:
   a third electronic switch device, wherein the third electronic switch device is between the input points of the magnetizing coil, wherein the third electronic switch includes a third controllable switch element that is connected via an input point of the input points of the magnetizing coil, wherein the third controllable switch element is configured to respond to a control signal.

4. A passenger conveyor, the passenger conveyer comprising:
   at least one operational brake, the operational brake including the energizing circuit according to claim 3.

5. The passenger conveyor according to claim 4, further comprising:
   a control system for the energizing circuit, the control system being configured to
      perform a normal operation, which includes controlling all of the first, second, and third electronic switch devices in such a way that when controlling the operational brake open, all of the first, second, and third electronic switch devices are controlled to be conductive until a current needed for opening the operational brake is received in the magnetizing coil of the operational brake, after which either the first electronic switch device or the second electronic switch device is opened;
      perform a normal stop, which includes opening the first electronic switch device and the second electronic switch device when the third electronic switch device is closed, such that a current of the magnetizing coil drops due to a forward loss of the magnetizing coil caused by the rectifying bridge; and
      perform a rapid stop, which includes opening the third electronic switch device, such that the current of the magnetizing coil is rapidly quenched by a counter voltage produced via a diode and a variable resistor functioning as a quenching circuit.

6. The passenger conveyor according to claim 5, wherein the control system is further configured to switch the first electronic switch device and/or the second electronic switch device on for a particular period of time in response to a determination that the current of the magnetizing coil has dropped below an intended holding current, until the current of the magnetizing coil is detected to have increased to the intended holding current.

7. The passenger conveyor according to claim 4, further comprising:
   a low-voltage DC supply as the at least one reduced voltage circuit,
   wherein the controllable operation switch is configured to connect, to the input points of the magnetizing coil, either the output terminals of the rectifying bridge or output terminals of the low-voltage DC supply.

8. The passenger conveyor according to claim 7, wherein the low-voltage DC supply has an output voltage between 12 V and 100 V.

9. The energizing circuit according to claim 1, wherein the first electronic switch device and the second electronic switch device each include
   a bipolar transistor or IGBT having an antiparallel diode connected in parallel, or a MOSFET.

10. A method for energizing a magnetizing coil of at least one operational brake of a passenger conveyor, the method comprising:
    operating an energizing circuit to feed at least two different voltage signals to the magnetizing coil based on an operational state of the operational brake,
    wherein the energizing circuit includes
       a rectifying bridge connected to an AC supply network, the rectifying bridge including output terminals that are connectable to input points of the magnetizing coil, and
       at least one reduced voltage circuit, the at least one reduced voltage circuit including an output that is connectable to the input points of the magnetizing coil via a controllable operation switch,
    wherein the controllable operation switch includes a first electronic switch device and a second electronic switch device connected in series with each other and fitted on an alternating-current side of the rectifying bridge,
    wherein the first electronic switch device includes a first controllable switch element and a first diode connected in antiparallel,
    wherein the second electronic switch device includes a second controllable switch element and a second diode connected in antiparallel, and
    wherein the first diode and the second diode are fitted in opposite directions to each other.

* * * * *